(12) United States Patent
Järvinen

(10) Patent No.: US 7,645,372 B2
(45) Date of Patent: Jan. 12, 2010

(54) METHOD FOR REMOVING THALLIUM FROM A ZINC-CONTAINING SOLUTION

(75) Inventor: Aimo Järvinen, Kokkola (FI)

(73) Assignee: Outotec Oyj, Espoo (FI)

( * ) Notice: Subject to any disclaimer, the term of this patent is extended or adjusted under 35 U.S.C. 154(b) by 1064 days.

(21) Appl. No.: 10/548,860

(22) PCT Filed: Feb. 24, 2004

(86) PCT No.: PCT/FI2004/000087

§ 371 (c)(1),
(2), (4) Date: Sep. 8, 2005

(87) PCT Pub. No.: WO2005/047551

PCT Pub. Date: May 26, 2005

(65) Prior Publication Data

US 2006/0179977 A1    Aug. 17, 2006

(30) Foreign Application Priority Data

Mar. 14, 2003    (FI)    ................................. 20030382

(51) Int. Cl.
C22B 3/24    (2006.01)
C22B 61/00    (2006.01)
C25C 1/16    (2006.01)

(52) U.S. Cl. .................. 205/602; 205/99; 205/604; 205/607

(58) Field of Classification Search .............. 205/602, 205/604, 607
See application file for complete search history.

(56) References Cited

U.S. PATENT DOCUMENTS 3,979,266 A * 9/1976 Fugleberg et al. ............ 205/602
4,096,233 A * 6/1978 Bodson ..................... 423/101
5,419,882 A    5/1995 Jibiki

FOREIGN PATENT DOCUMENTS

| JP | 62-188734 | | 8/1987 |
| JP | 4-170317 | | 6/1992 |
| WO | WO 03/023077 | * | 3/2003 |

* cited by examiner

*Primary Examiner*—Patrick Ryan
*Assistant Examiner*—William T Leader
(74) *Attorney, Agent, or Firm*—Buchanan Ingersoll & Rooney PC

(57) ABSTRACT

This invention relates to a method for removing thallium from a zinc-containing solution. In particular, the method relates to the purification with metallic zinc powder of a solution going to the electrolytic production of zinc. In this method, thallium is removed by means of a lead compound in the solution purification stage, either during the final purification stage or in a purification stage in which cadmium is precipitated.

6 Claims, No Drawings

METHOD FOR REMOVING THALLIUM FROM A ZINC-CONTAINING SOLUTION

This application is the national phase application under 35 U.S.C. §371 of International Application No. PCT/FI2004/000087 filed on Feb. 24, 2004, entitled, "METHOD FOR REMOVING THALLIUM FROM A ZINC-CONTAINING SOLUTION" which claims the benefit of Finnish Patent Application No. 20030382 filed on Mar. 14, 2003.

This invention relates to a method for removing thallium from a zinc-containing solution. In particular, the method relates to the purification with metallic zinc powder of a solution going to an electrolytic production of zinc. In this method, thallium is removed by means of a lead compound in the solution purification stage, either during the final purification stage or in a purification stage in which cadmium is precipitated.

Zinc calcine, obtained by roasting sulphidic zinc concentrates, is generally used as the starting material in the electrolytic production of zinc. The chief component of the calcine is zinc oxide, ZnO, but some of the zinc is also bound to iron in the form of zinc ferrite $ZnO.Fe_2O_3$. Zinc oxide is easily soluble even at high pH values, whereas ferrite has to be leached at a higher acid content. In an industrial process, the first stage of zinc oxide leaching, neutral leaching, is generally carried out at a pH of 2-5 with electrolysis return acid. Neutral leaching gives rise to a zinc sulphate solution, which is routed to solution purification, and a precipitate that still contains zinc compounds and the iron of the calcine. The precipitate is conducted to the next leaching stage. Many of the impurities in the zinc calcine, e.g. copper, cobalt, nickel, cadmium and thallium dissolve as sulphates in the first leaching stage with good leaching yields and thus go directly to solution purification.

Thallium is an impurity that impairs the quality of zinc if it reaches as far as electrolysis in solution. When zinc is precipitated electrolytically, the thallium in solution precipitates among the zinc and can no longer be removed by melt refining during smelting.

A method is described in U.S. Pat. No. 4,096,233, whereby thallium is removed from a zinc sulphate solution by oxidation with peroxy- or peroxide sulphuric acid or hydrogen peroxide.

According to the method presented in U.S. Pat. No. 4,715,939, monovalent ions such as thallium for example are removed from a zinc sulphate solution using electrodialysis.

The method described in U.S. Pat. No. 5,419,882 also relates to method of removing thallium from a zinc sulphate solution. According to this patent, the final removal of thallium was earlier carried out using potassium permanganate, potassium dichromate or potassium chromate. In the method described in this publication, thallium removal is performed using manganese dioxide precipitate obtained from zinc electrolysis.

In oxidation-based methods, thallium removal is based on the oxidation of monovalent thallium to trivalent thallium, which forms a poorly soluble hydroxide in the pH region in question. In these methods, a problem arises with the $Mn^{2+}$ contained in the solution, the majority of which is oxidised into $MnO_2$, consuming the oxidant and forming a solid that is difficult to filter.

It is possible to obtain a zinc sulphate solution with the methods described above that does not contain thallium, but often the methods require a separate purification stage, which increases the costs of zinc fabrication.

A method has now been developed in accordance with the present invention for the removal of thallium from a zinc-containing solution using zinc powder during solution purification without a separate purification stage. According to the method, the amount of lead is adjusted in the cadmium purification stage to at least the equivalent of the amount of thallium. Preferably soluble lead compounds are used to adjust the amount of lead.

The essential features of the invention will be made apparent in the attached claims.

The zinc sulphate solution from the first leaching stage of zinc calcine, neutral leaching, is conducted to multi-stage solution purification. In so called arsenic purification, the first stage is generally copper removal, and after that cobalt, nickel, germanium and antimony removal stages. Thallium cannot be made to precipitate in these purification stages. The final purification stage is cadmium removal, when thallium is also precipitated, as is lead, if it is in solution. Normally lead has already been precipitated in earlier purification stages.

Zinc sulphate solution purification stages are carried out with fine zinc powder, using either nobler than zinc, they can be cemented from the solution by means of zinc powder in accordance with the following reaction:

$$Me^{++} + Zn^\circ \rightarrow Me + Zn^{++} \qquad (1)$$

It has now been found that thallium can be precipitated from a zinc sulphate solution in the cadmium removal stage, which is performed using zinc powder. In addition, the amount of lead is adjusted to be at least the equivalent of the amount of thallium contained in the solution. Preferably a suitable soluble lead compound is used for adjusting the amount of lead. One soluble lead compound that could be used for example is lead acetate, $Pb(C_2H_3O_2)_2.H_2O$. In order to feed the correct amount, it is advantageous to analyse the amounts of thallium and lead entering the cadmium removal stage and to adjust the amount of lead at least to correspond to the amount of thallium.

When analysing the residue formed in the cadmium precipitation stage, it has been found that thallium precipitates with lead onto the precipitate granule on the surface of the metallic zinc, which granule forms when cadmium starts to precipitate on the surface of the zinc powder particle. At the same time the zinc particle itself dissolves and forms zinc sulphate. Hardly no thallium appears in the part of the precipitate granule that contains cadmium.

The final thallium content is also affected by the temperature, which is in the region of 50-100° C., preferably around 60-70° C. At higher temperatures the precipitation rate is high, but the final thallium content remains higher. At low temperatures precipitation is slow, but the final thallium content is low.

The cadmium purification stage yields a pure zinc sulphate solution, which can be directed to zinc electrolysis, and a cadmium precipitate, which contains the thallium removed from the zinc solution. If the fabrication of pure cadmium is desired, removal of impurities in the precipitate such as zinc, lead, thallium and others is performed in the normal way during cadmium fabrication.

The method according to the invention is described further by the following example.

EXAMPLE

After ordinary cadmium precipitation the thallium content of a zinc sulphate solution is between 1.5-2.5 mg/l, which means a content of about 10 g/t i.e. 10 ppm in zinc. A test run was performed where a lead acetate solution with a lead content of around 200 g/l at a temperature of 67° C. was fed into the process. In the test the amount of lead that enters the cadmium removal stage inherently was tripled. The amount of thallium precipitated was doubled even though the amount entering the process stage remained the same. The final thallium content fell to a level of 0.5-0.9 mg/l, which corresponds to a content of about 3 g/t in pure zinc i.e. 3 ppm. The thallium content in pure zinc is thus low enough for commercial purposes.

The invention claimed is:

1. A method for the removal of thallium from a zinc-containing solution in connection with the electrolytic production of zinc, comprising:
   conducting the zinc-containing solution which additionally contains thallium and cadmium to a cadmium purification stage,
   adding a soluble lead compound to the zinc-containing solution so that the amount of lead is adjusted to be at least equivalent to the amount of thallium, and
   adding zinc powder to the zinc-containing solution to precipitate cadmium and thallium, thereby removing thallium from the zinc-containing solution.

2. A method according to claim 1, wherein the soluble lead compound is lead acetate.

3. A method according to claim 1, wherein the soluble lead compound is fed continuously.

4. A method according to claim 1, wherein the zinc-containing solution is zinc sulphate solution.

5. A method according to claim 1, wherein thallium removal takes place at a temperature between 50-100° C.

6. A method according to claim 1, wherein thallium removal takes place at a temperature between 60-70° C.

* * * * *